United States Patent
Smith

(10) Patent No.: US 12,144,333 B1
(45) Date of Patent: Nov. 19, 2024

(54) FISHING BOBBER WITH FILLABLE BLADDER

(71) Applicant: Nathan Smith, Kenai, AK (US)

(72) Inventor: Nathan Smith, Kenai, AK (US)

(*) Notice: Subject to any disclaimer, the term of this patent is extended or adjusted under 35 U.S.C. 154(b) by 0 days.

(21) Appl. No.: 18/228,146

(22) Filed: Jul. 31, 2023

(51) Int. Cl.
*A01K 93/00* (2006.01)

(52) U.S. Cl.
CPC .................... *A01K 93/00* (2013.01)

(58) Field of Classification Search
CPC .................................................. A01K 93/00
See application file for complete search history.

(56) References Cited

U.S. PATENT DOCUMENTS

| | | | | |
|---|---|---|---|---|
| 3,071,787 A * | 1/1963 | Burker | A01K 93/00 | 222/5 |
| 3,664,053 A * | 5/1972 | Beverly | A01K 93/00 | 43/43.15 |
| 3,698,120 A * | 10/1972 | Grogan | A01K 93/00 | 43/44.87 |
| 3,747,257 A * | 7/1973 | Olsen | A01K 93/00 | 43/44.87 |
| 3,757,453 A * | 9/1973 | Therres | A01K 93/00 | 43/43.14 |
| 3,990,172 A * | 11/1976 | Hagquist | A01K 93/00 | 43/44.87 |
| 4,090,318 A * | 5/1978 | Webster | A01K 93/00 | 43/44.92 |
| 4,571,874 A * | 2/1986 | Smaw | A01K 93/00 | 43/4.5 |
| 6,612,066 B1 * | 9/2003 | James | A01K 93/00 | 43/43.14 |
| 7,913,445 B2 * | 3/2011 | St. Germain | A01K 93/00 | 43/42.22 |
| 2016/0309691 A1 * | 10/2016 | Ancona | A01K 91/03 | |

* cited by examiner

*Primary Examiner* — Michael H Wang
(74) *Attorney, Agent, or Firm* — Michael Tavella

(57) ABSTRACT

An elastic bladder that is filled with water. The water adds weight to the line for casting, allowing a lure to be cast farther. The bladder has an arrangement of tubes that are inserted into each other. One long rigid tube has a folding hinge at the base. A leader is secured to the bladder with a bridle. The remainder of the leader can be coiled and attached in the "v" of a lower valve that retains the water in the bladder. This coiling allows the bladder to be positioned far above the hook, allowing the hook to be placed deeper than when using an ordinary float. After casting, the hinge is released, and the bladder empties, becoming a float.

7 Claims, 11 Drawing Sheets

FISHING BOBBER WITH FILLABLE BLADDER

CROSS-REFERENCE TO RELATED APPLICATIONS

Not Applicable

FEDERALLY SPONSORED RESEARCH AND DEVELOPMENT

Not applicable

JOINT RESEARCH AGREEMENT

Not applicable

BACKGROUND OF THE INVENTION

Field of the Invention

This invention relates to fishing bobbers, particularly fishing bobbers with fillable bladders.

Description of the Prior Art

When anglers use bobbers or floats for fishing, there are a couple of challenges and limitations inherent. The first is that whatever bulk and weight is necessary to cast the hook to the desired location remains attached to the line while fishing. This drastically limits the practical weight and, thus, the casting distance of the float. This also increases the effect of wind and wave movements and (more importantly) reduces the angler's feel for the fish once a fish takes the hook. The second main limitation is the line length between the float and the hook. Many times, one wants to have the hook at a depth that exceeds the length of the fishing rod. However, one cannot readily cast a line when this leader length approaches or exceeds the length of the fishing rod. A bobber may be rigged to slide up and down with some success. Still, it would be better to consistently deploy the hook to virtually any chosen depth with great confidence that it was where desired, and that the bobber was not sliding down the line during a retrieve.

To address these concerns, inventors have sought out better floats. In U.S. Pat. No. 427,730, teaches an inflatable float. The float is filled with air for use and is deflated for storage. Although this makes for a convenient float, it does nothing to solve the casting weight problem or the problem of line length. Other air inflatable floats are found in U.S. Pat. Nos. 1,469,885, 2,677,208, 5,233,781 (this patent is interesting in that it is a balloon float that the wind can blow and when a fish takes the hook and pulls, it releases a valve that deflates the balloon to allow easy retrieval of the fish), and U.S. Pat. No. 5,651,210.

All the devices listed above use air as an inflating medium in some way. All retain the two problems mentioned above.

BRIEF DESCRIPTION OF THE INVENTION

The instant invention overcomes the problems listed above. The invention consists mainly of tubes, two elastic and two rigid, inserted into each other. The outer tube is elastic and is filled with water—providing casting weight, which is then released after the cast. Surgical tubing or other elastic material can be used. The outer tube is a bladder into which water can be forced. It is fitted at the top with a check valve. The next tube is rigid and inside of the outer one. The top of this rigid tube stops short of the top of the outer tube, allowing room for the check valve. A lashing, clamp, or similar device secures the inner and outer tubes together at the top of the rigid tube. The bottom of this rigid tube extends beyond the bottom of the outer elastic tube. They are similarly lashed or clamped together near the end of the elastic tube. The rigid tube has a few perforations to allow water to flow in and out in the section between the clamps or lashings. A third tube is a smaller diameter elastic tube, which has been inserted through the inside of the previous rigid tube. It must not extend to the top of the longer rigid tube but beyond the bottom of it, far enough to be inserted through the short rigid tube. The fourth and last tube is rigid, similar to the other rigid one, but much shorter. When the smaller elastic tube is pulled through it, the short tube will butt up to the longer rigid tube. The inner tube can be secured mechanically or by friction and water pressure.

The other fittings are a buoyant donut around the upper end of the outer elastic tube for added floatation and a bridle rigged from the top lashing/clamp point to a latch located on the lower end of the long rigid tube. This latch engages the short rigid tube. The short tube is folded upward, hinging on the small elastic tube. The pinch point where the hinging happens serves two purposes. First, it acts as a releasable shut-off valve for the water inside the outer bladder. Second, it provides a place to clamp a coil of leader, if desired, securely.

In use, an angler determines the depth to fish and coils up that much leader, clamping that coil in the hinge of the rigid tubes. Then the fishing line is secured to a slider on the bridle with the latch latched. The desired amount of water is then forced in through the check valve at the top to provide optimal casting weight. A syringe or similar water pump is required. If desired, a fish-attracting solution can be mixed with this water before it is forced in. Once filling is complete, the angler lifts the bobber with the fishing rod, taking care that the slider the line is attached to is against the latch. The angler casts to the desired location. Substantial weight (several ounces can be easily used) and management of the leader allow for very long casts. When the bobber lands, the slider may shift on the bridle and release the latch. If not, a slight tug on the line will release the latch, causing the bobber to jettison the ballast water and release the coiled leader. The deflated bladder is now buoyant and acts as a normal bobber. Once a fish is hooked, the angler will appreciate the lighter, less bulky bobber while playing the fish.

It is an object of this invention to make a system in which a bladder can be used to add weight to a line for casting and then have the bladder lose the extra weight and become a float.

Another object of this invention is to create a system in which leader line can be coiled to place a hook deeper than a normal bobber allows.

DETAILED DESCRIPTION OF THE INVENTION

Figure 1:
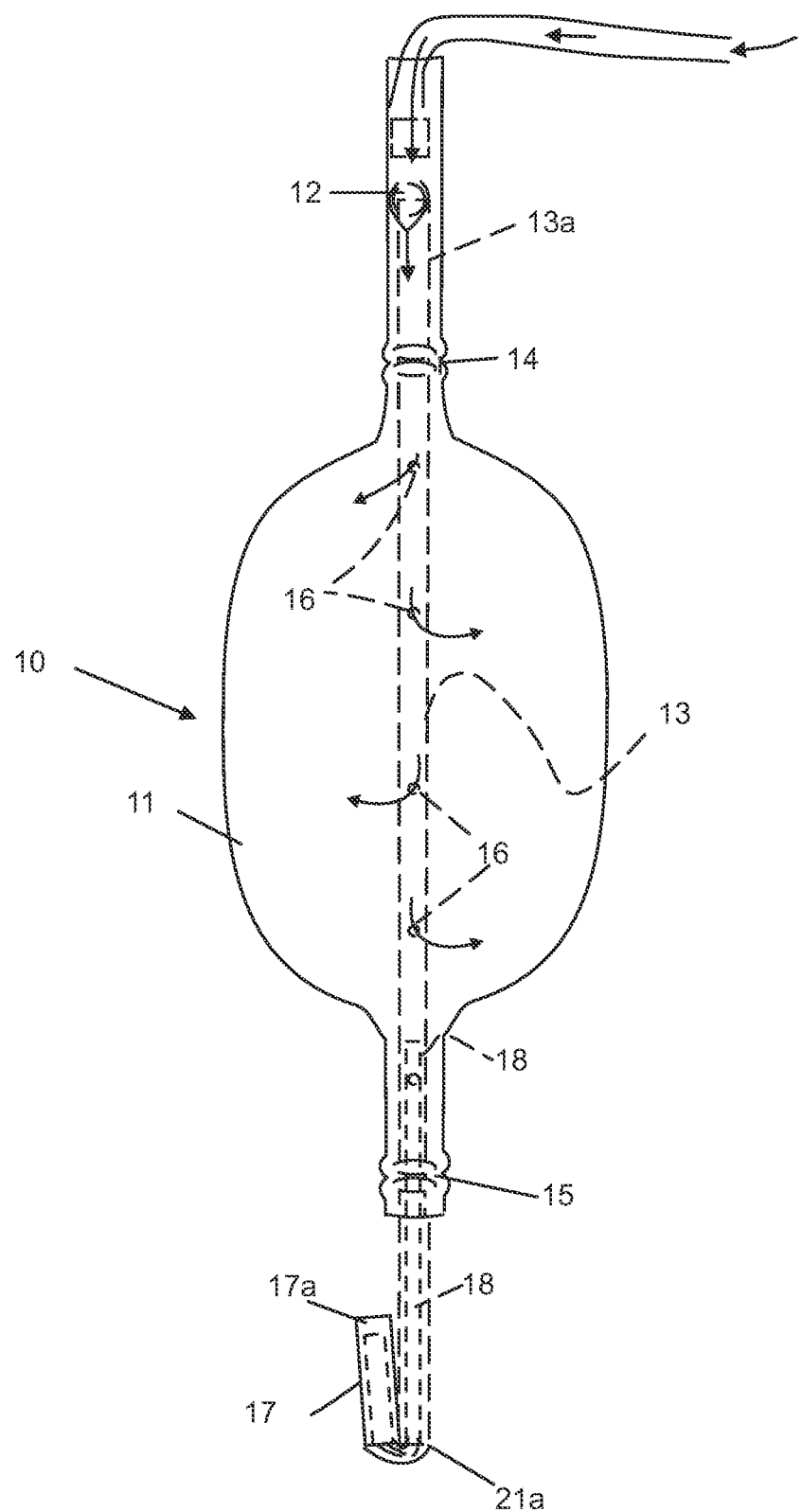
FIG. 1 is a side view of the invention showing the outer bladder filled with water, and the lower hinge valve closed without the lines.
Figure 2:
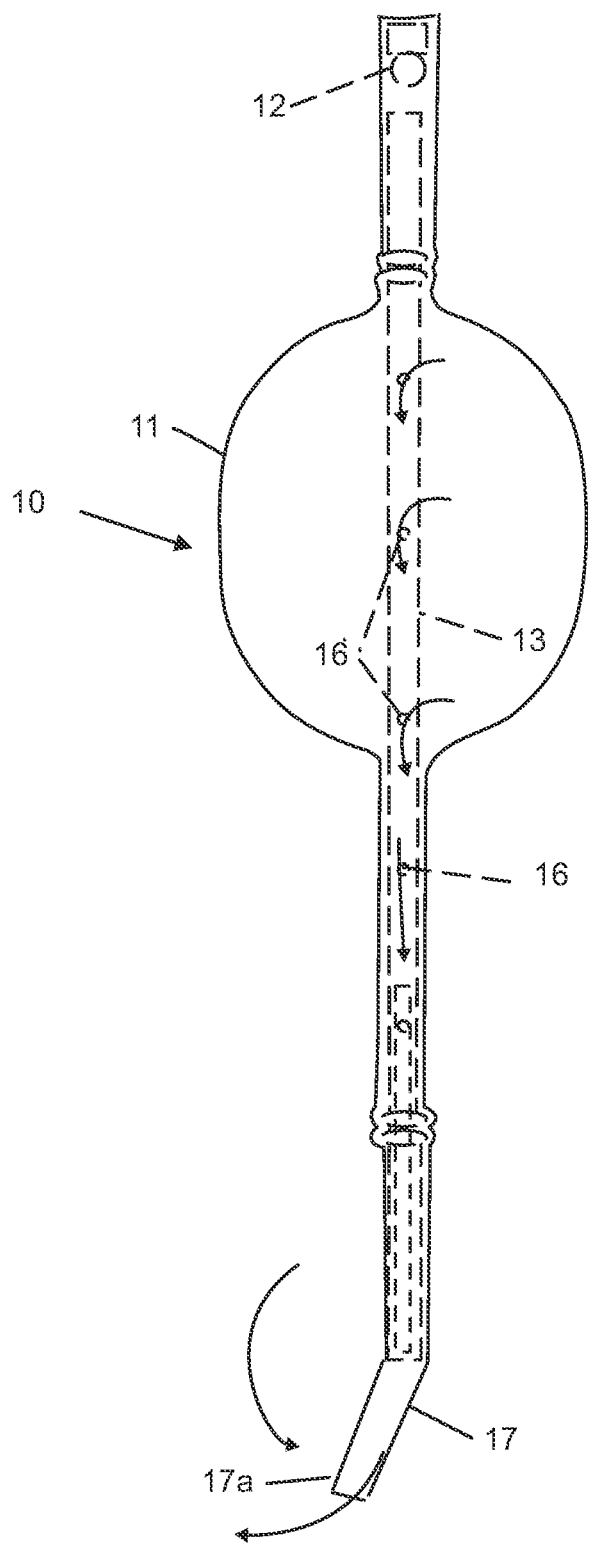
FIG. 2 is a side view of the invention showing the lower valve open and the bladder being drained.

Referring now to the drawings and particularly to FIGS. 1 and 2, invention 10 consists mainly of an arrangement of tubes, two elastic and two rigid, inserted into each other. The outer tube 11 is elastic and is filled with water—providing casting weight, which is then released after the cast. Surgical tubing or other elastic material can be used. The outer tube 11 is a bladder into which water can be forced. It is fitted at the top with a check valve 12. The check valve 12 allows water to enter from the top (see arrows) and holds it in place. The next tube 13 is rigid and inside of the outer bladder 11. The top 13a of this rigid tube 13 stops short of the top of the outer tube, allowing room for the check valve 12. A lashing, clamp, or similar device 14 secures the inner and outer tubes together at the top of the rigid tube. The bottom of this rigid tube extends beyond the bottom of the outer bladder 11. They are similarly lashed or clamped together 15 near the end of the bladder 11. The rigid tube has a few perforations 16 to allow water (arrows) to flow in and out in the section between the clamps or lashings. A third tube 17 is rigid and shorter than rigid tube 13. Rigid tube 13 and the third tube 17 comprise two parts connected by a hinge 21a. The fourth and last tube 18, is flexible. It is inserted inside the rigid tube 13. It must not extend to the top of the rigid tube but beyond the bottom of it, far enough to be inserted into the rigid tube 17. When the smaller elastic tube 18 is pulled through tube 17, the short tube butts up against rigid tube 13, leaving a flap 17a. The inner tube 18 can be secured mechanically or by friction and water pressure.

FIG. 2 is a side view of the invention showing the lower valve open and the bladder draining (see arrows). As discussed below, a mechanism (not shown here) releases the flap 17a that allows bladder 11 to drain. Once drained, bladder 11 acts as a float.

Figure 3:
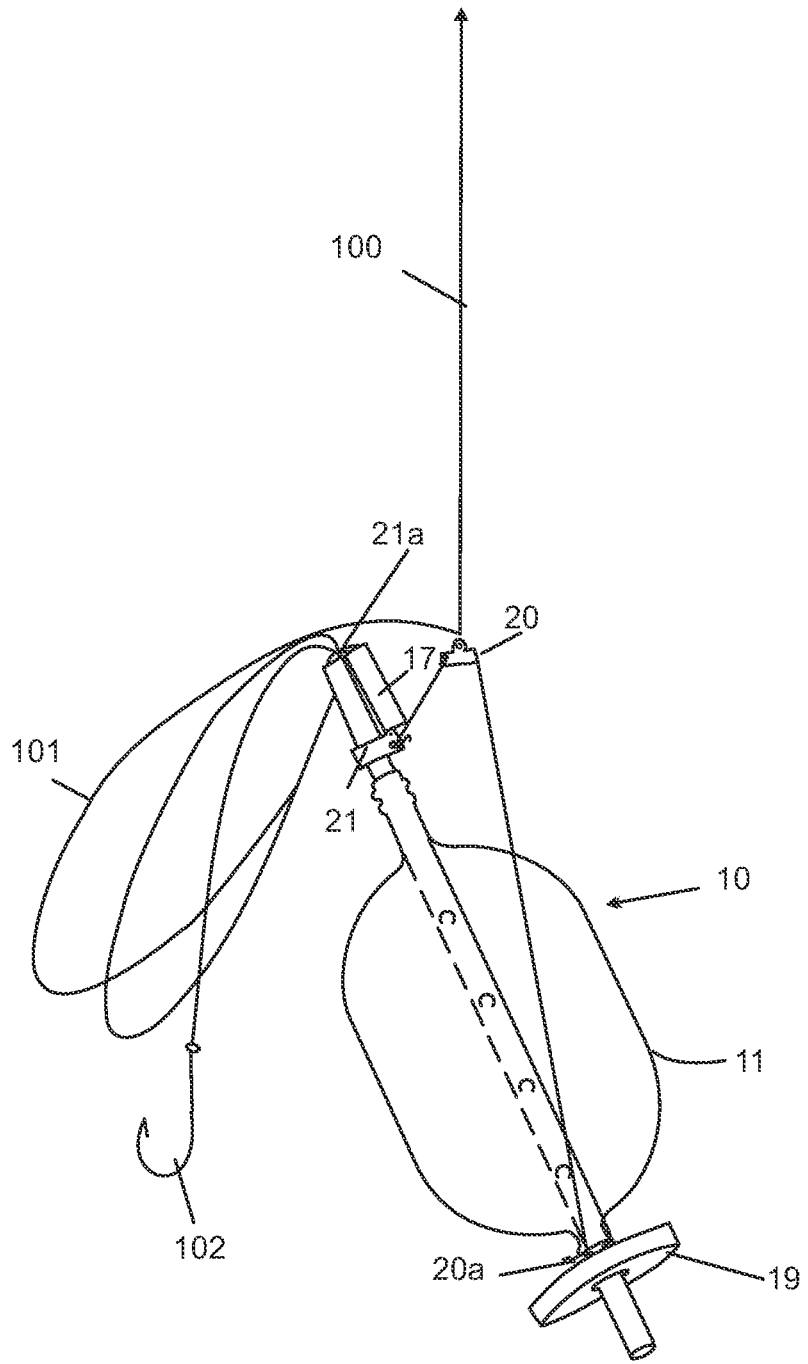
FIG. 3 is a detail view of the invention showing the bladder filled with water and attached to a fishing line ready for casting.
Figure 4:
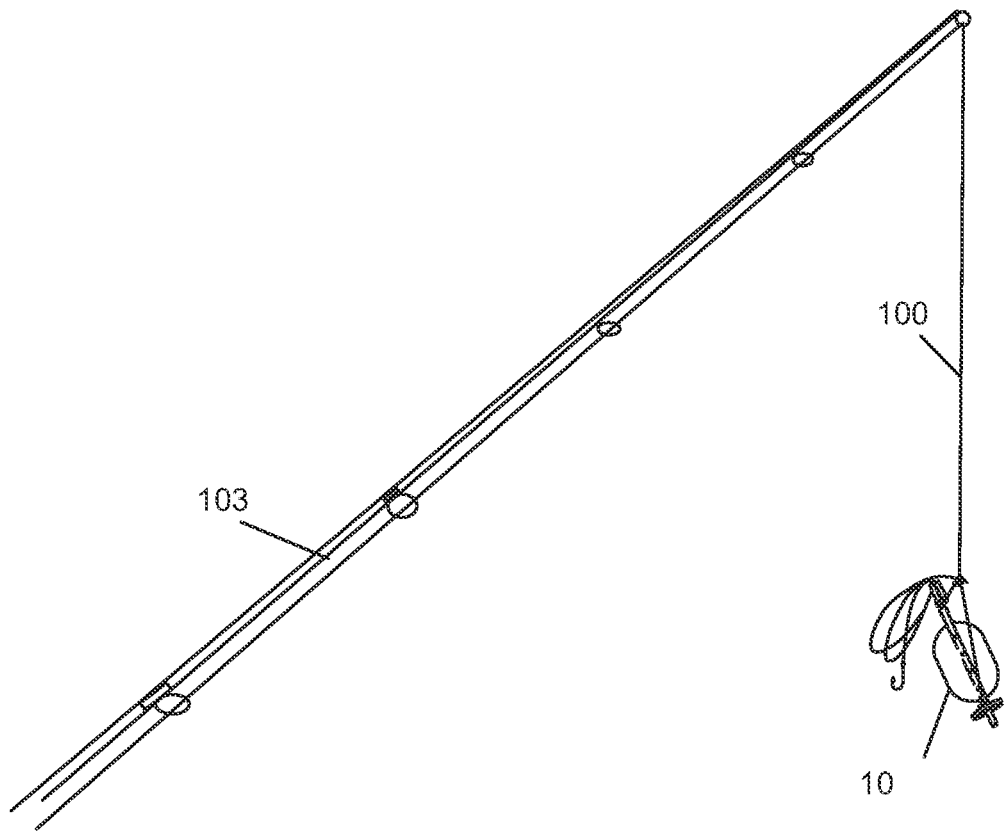
FIG. 4 is a detail view of a fishing pole showing the invention ready for casting.

FIG. 3 is a detail view of invention 10, showing bladder 11 filled with water and attached to a fishing line 100, ready for casting. Here, invention 10 is shown fully assembled and includes a buoyant donut 19 around the upper end of the outer bladder 11 for added floatation and a bridle, which has a small block 20 that is rigged with lines from the top lashing/clamp point 20a to a latch 21 located on the lower end of the long rigid tube 13. This latch 21 engages tube 17. The short tube is folded upward, hinging on the small elastic tube 18 at hinge 21a (or pinch point). The pinch point 21a serves two purposes. First, it acts as a releasable shut-off valve for the water inside the outer bladder 11. Second, it provides a place to clamp a coil of leader 101 with hook 102, if desired, securely. Note, as shown in FIG. 3, the device 10 is suspended upside down for casting. FIG. 4 is a detail view of a fishing pole 103 showing the invention ready for casting.

Figure 5:
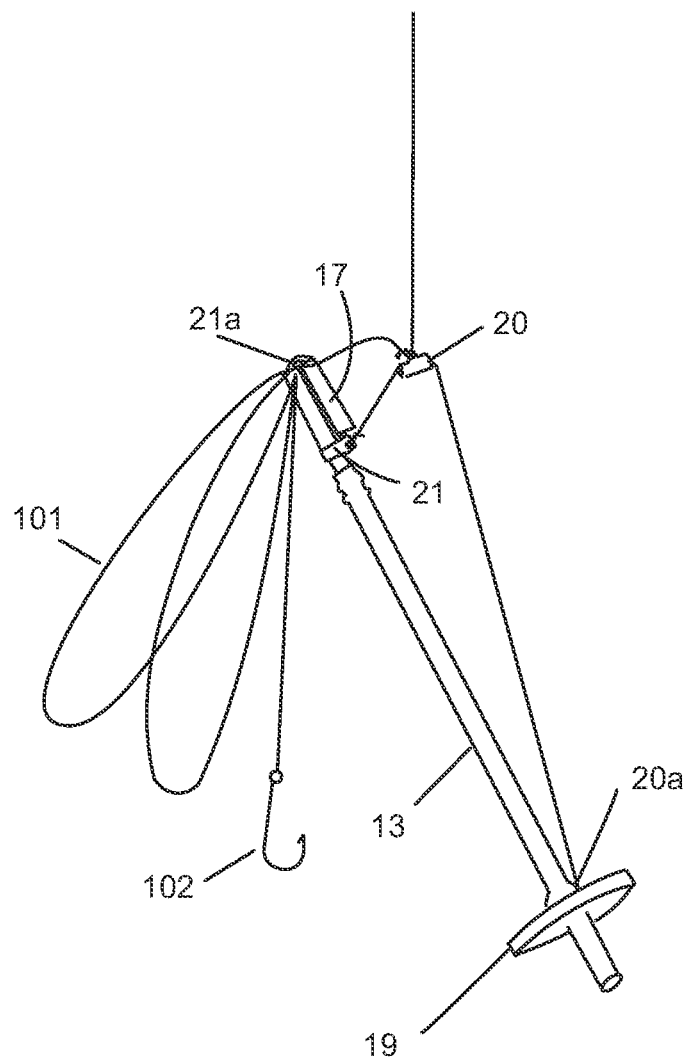
FIG. 5 is a detail view of the invention with the bladder empty.

FIG. 5 is a detail view of the entire invention with the outer bladder empty. Note the buoyant donut 19 on the rigid tube 13 for orientation purposes. This view shows the hinged bottom valve more clearly. It shows the lines from point 20a to latch 21 on the lower end of the long rigid tube 13. This latch 21 engages the short tube 17 at point 17a. The short tube is folded upward, hinging on the small elastic tube 18. The pinch point 21a is also shown.

Figure 6:
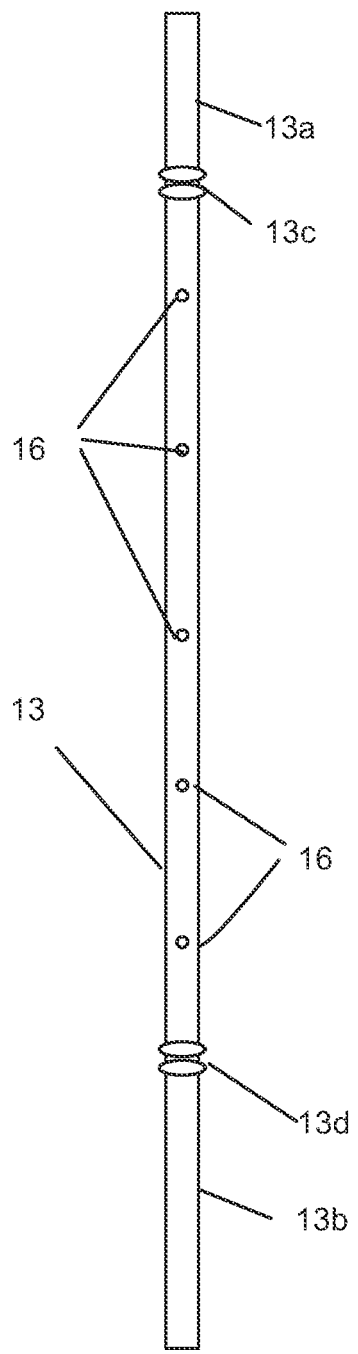
FIG. 6 is a side detail view of the first rigid tube.

FIG. 6 is a side detail view of the first rigid tube 13. As noted, tube 13 is a straight length having a top 13a and a bottom 13b. Tie points 13c and 13d are provided to secure the lashings, clamps, or similar devices 14 and 15 that secure the inner and outer tubes. Note, too, that perforations 16 are used to fill and empty the outer bladder 11.

Figure 7:
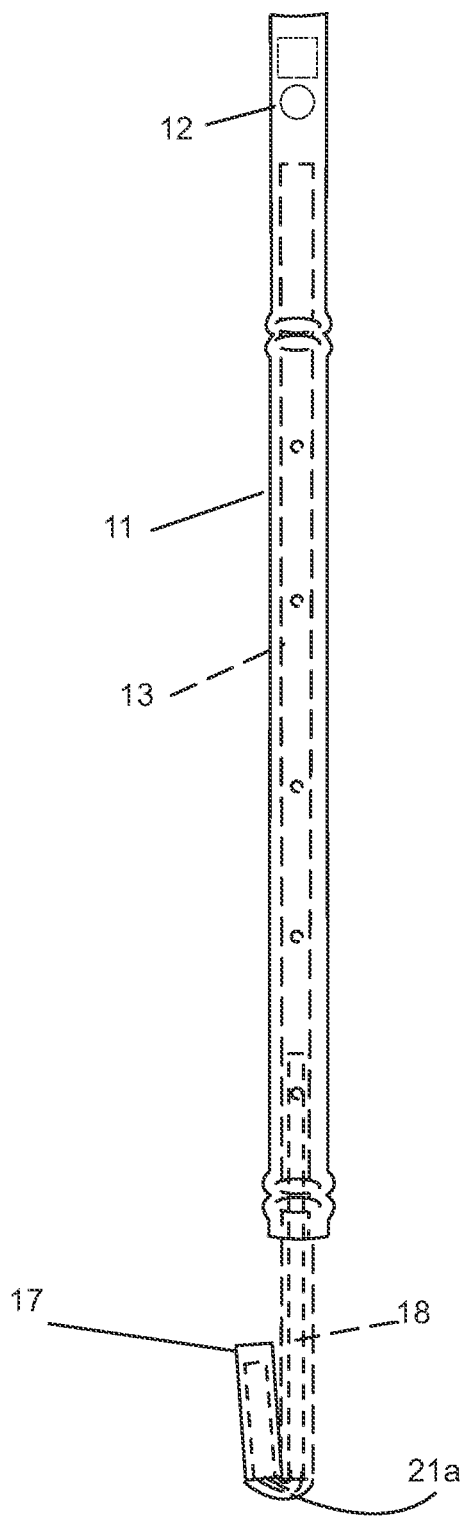
FIG. 7 is a side detail view of the assembled bladder and tubes showing the outer bladder empty.

FIG. 7 is a side detail view of the assembled bladder 11 and tubes showing the outer bladder 11 empty. In this view, the outer bladder 11 is shown in place with the check valve 12 shown in place. In this view, the bladder 11 is shown along with the second, small, flexible tube 18 and the second rigid tube 17 as installed. Note how the small tube 18 extends up into the first rigid tube 13 and extends down past the hinge point (pinch point) 21a, while tube 17 butts up against the first rigid tube 13 and down past the end of the small tube 18 to allow the flap to form that acts as the drain valve when released.

Figure 8:
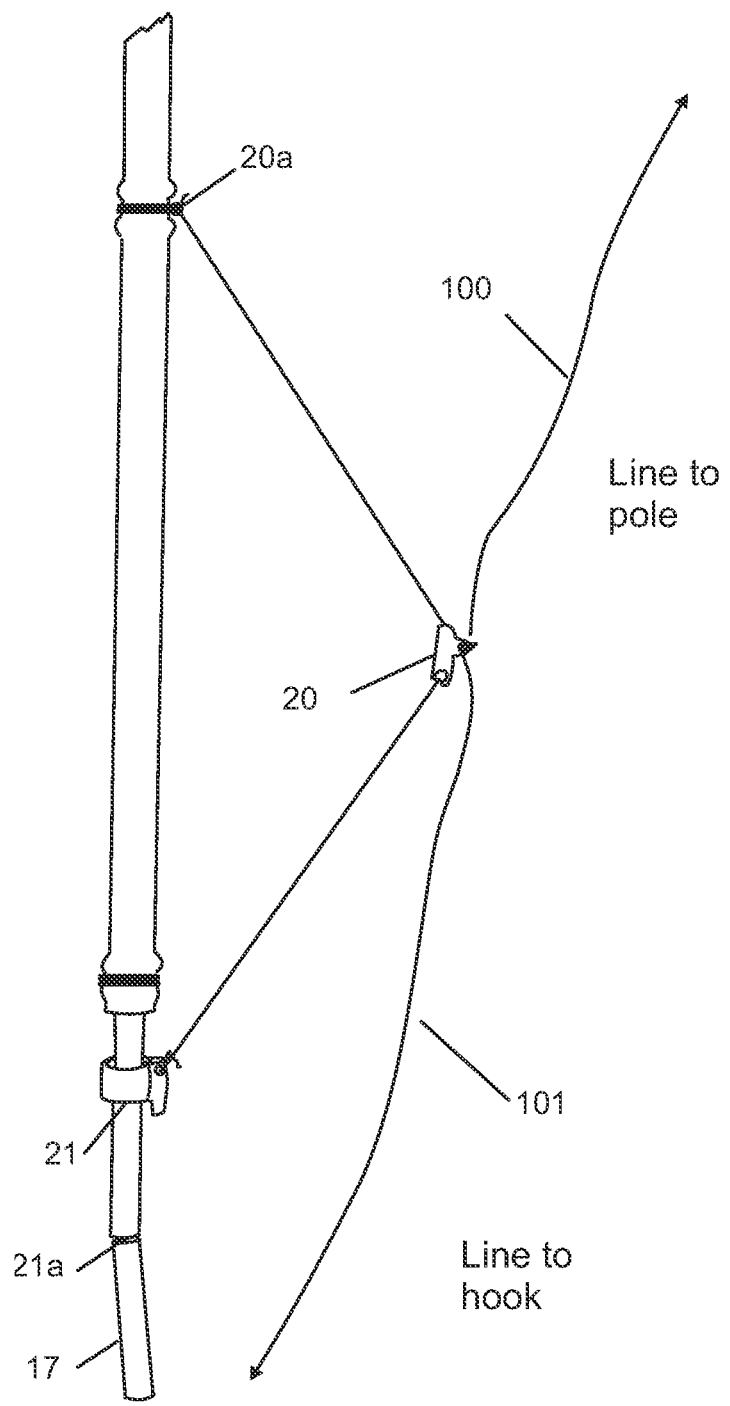
FIG. 8 is a side detail view of the assembly showing the line rigging.

FIG. 8 is a side detail view of the assembly showing the line rigging. Here, the first rigid tube 13 is shown with the outer bladder 11 empty. Block 20 is shown. Note the line extending upward to the pole (not shown). Note the line extending to point 20a and the other extending to latch 21. The line labeled 101 is the line going to hook 102 (not shown). Note that the lower valve is shown open with tube 17 bent downward.

Figure 9:
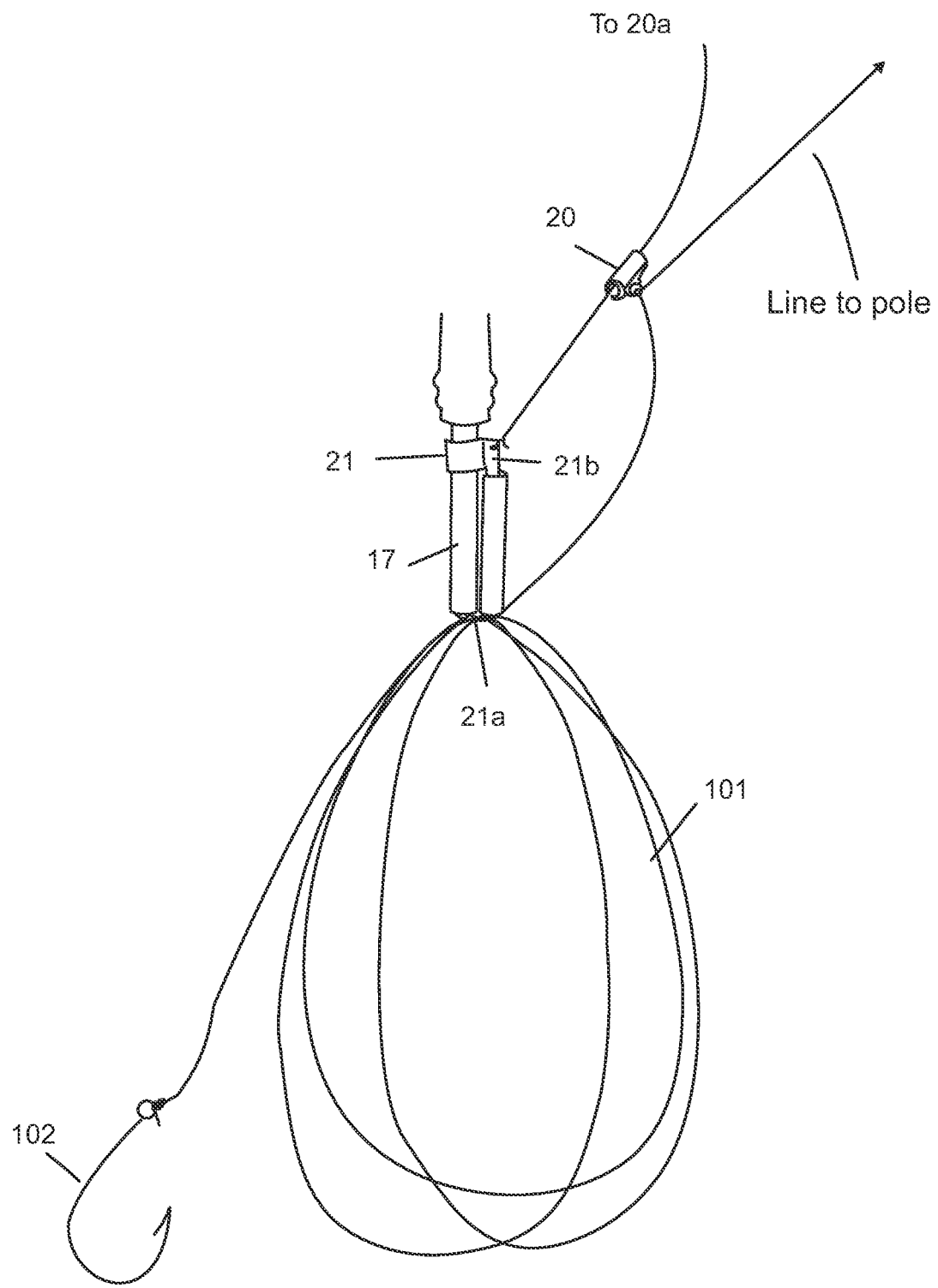
FIG. 9 is a detail view of the lines showing the rigging before casting.

FIG. 9 is a detail view of the lines showing the rigging before casting. Here, latch 21 is shown in place, holding the lower valve closed. This is achieved by folding the flexible tube 18 over at pinch point 21a and pushing tab 21b into the end of tube 17, as shown. Note the line coming from the bridle 20. Note, too, the coil of line 101 held by pinch point 21a.

Figure 10:
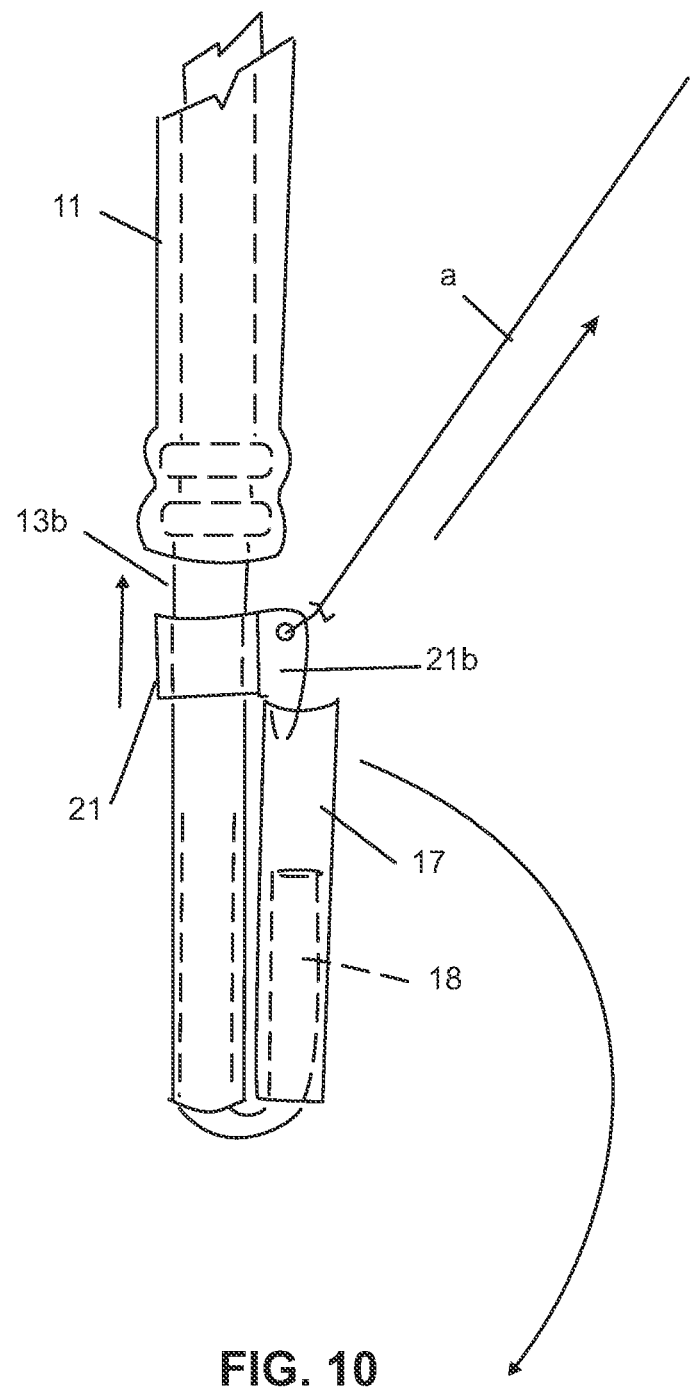
FIG. 10 is a detail view showing the release mechanism for the lower valve with the valve closed.

FIG. 10 is a detail view showing the release mechanism for the lower valve with the valve closed. This is an enlarged detail. Here, the bottom 13b of the first rigid tube 13 is shown along with part of the outer bladder 11. Note latch 21 is shown in place with tab 21b shown holding the bottom of tube 17 in place. When line a is pulled upward as indicated by the arrow, the latch 21 is pulled upward as indicated by the arrow. Once tip 21b leaves tube 17, tube 17 can fall, releasing the coiled line (not shown) and draining the outer bladder 11, shown in FIG. 11.

Figure 11:
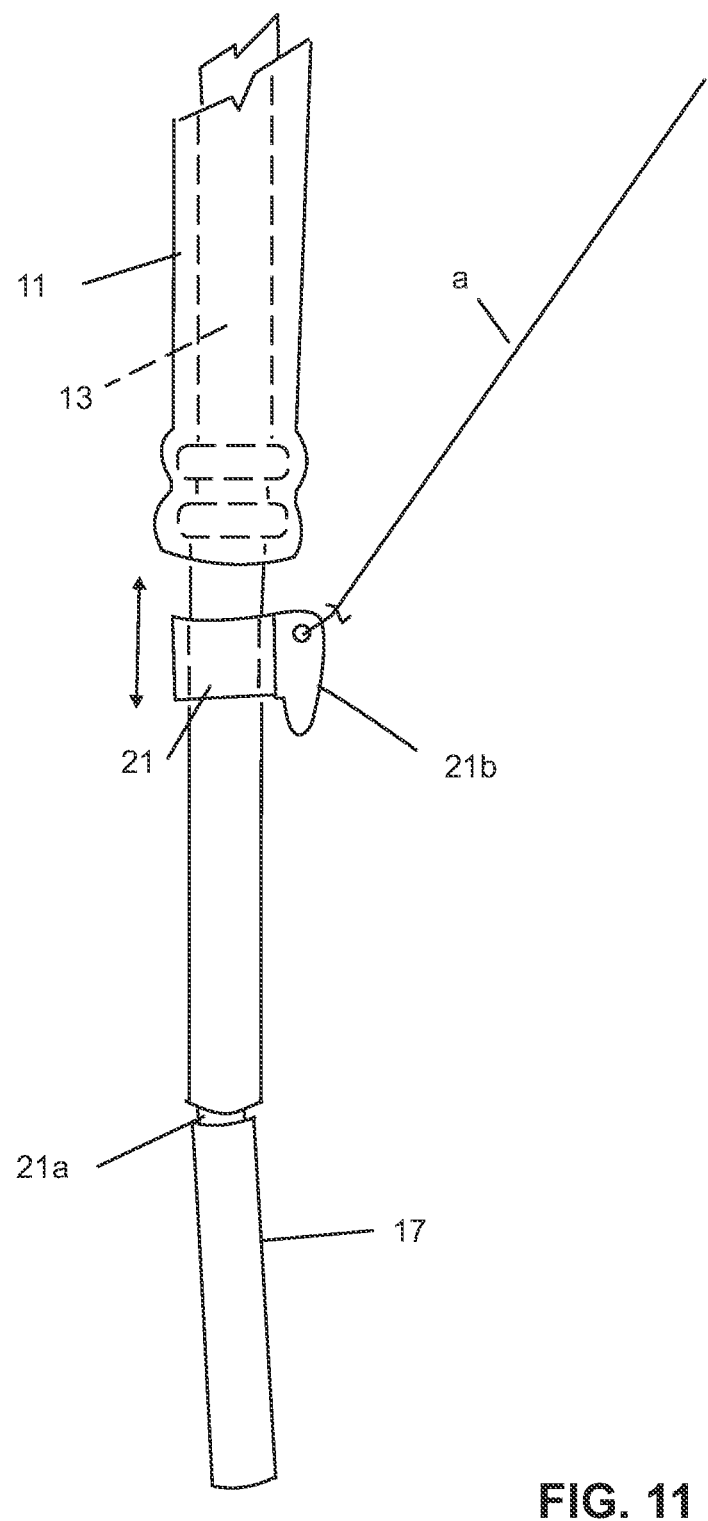
FIG. 11 is a detail view of the latch released and the lower valve opened.

FIG. 11 is a detail view showing the release mechanism open. As noted above, after tip 21b releases tube 17, the bottom portion of tube 17 falls. As noted above, this drains the bladder 11. It also releases any line held by tube 17 when closed.

Once bladder 11 is drained, the bladder becomes a float. In use, the device is cast out. The weight of the water in bladder 11 enables the cast to be long, reaching a good distance. Once the device hits the water, the latch 21 often releases. If it does not, the user simply pulls up on the line to release it. Once released, the now empty bladder 11 becomes a float while the line held by the hinge can drop deeper than what was possible using ordinary floats.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

The invention claimed is:

1. A fishing bobber with a fillable bladder comprising: an outer flexible tube forming an outer bladder into which water can be forced, said outer bladder having a top; a check valve installed in the top of said outer bladder; a first rigid tube positioned inside of said outer bladder said first rigid tube having a top and a bottom, and further wherein the top of the first rigid tube is secured to said outer bladder at a top lashing point, and further wherein the bottom of said first rigid tube extends beyond the bottom of the outer bladder and further wherein the bottom of said outer bladder is secured to the bottom of said first rigid tube by a bottom lashing point, said first rigid tube further having a center portion having at least one perforation therein; a second rigid tube, being connected by a hinge, abutting said first rigid tube; and a second flexible tube, positioned inside said second rigid tube and said first rigid tube such that the second flexible tube does not extend beyond the bottom of said second rigid tube.

2. The fishing bobber of claim 1 wherein said outer bladder has an empty state in which the outer bladder is empty of liquid and a full state wherein said outer bladder is filled with liquid.

3. The fishing bobber of claim 2 wherein said outer bladder is in a closed state when said second rigid tube and said second flexible tube are folded into a closed position, and said outer bladder is in an open state when said second rigid tube and said second flexible tube are unfolded into an open position.

4. The fishing bobber of claim 3 further comprises a latch, having a body, slidably attached to the bottom of said first rigid tube, and a latch portion extending downwardly from said body, said slidable latch having a release position and a latch position.

5. The fishing bobber of claim 4 wherein when said latch is in said latch position, said second rigid tube and said second flexible tube are folded into a closed position, and further wherein said second rigid tube and said second flexible tube are retained in said closed position by said latch portion being inserted into said second rigid tube; and when said latch is in said release position, said latch portion is removed from said second rigid tube.

6. The fishing bobber of claim 5 further comprises: a bridle, comprising a block, a first line extending from said block to the top lashing point, and a second line extending from said block to said latch.

7. The fishing bobber of claim 1 further comprising a buoyant donut positioned around the upper end of said outer bladder.

* * * * *